May 20, 1924.
A. W. LUSEBRINK
CAR BRAKE
Filed Jan. 30, 1924    2 Sheets-Sheet 1
1,494,363
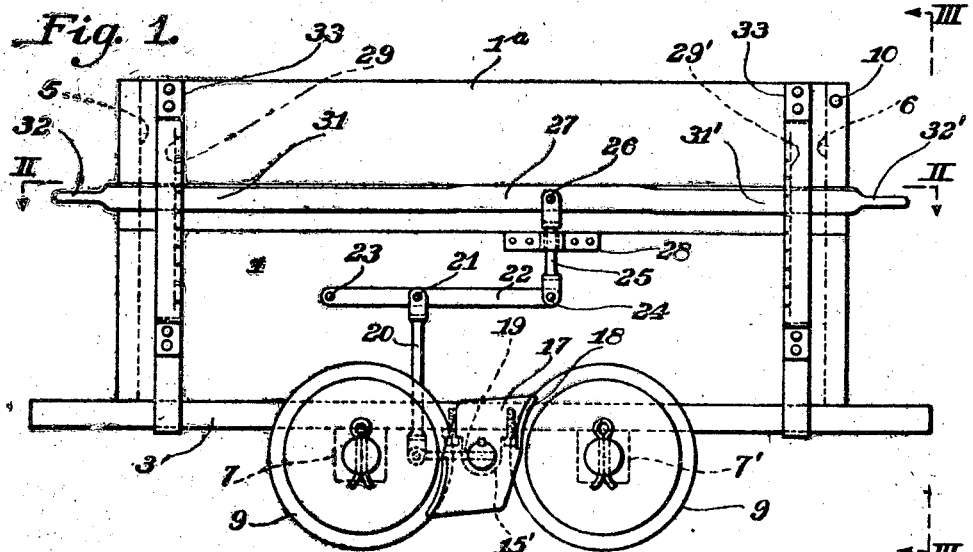
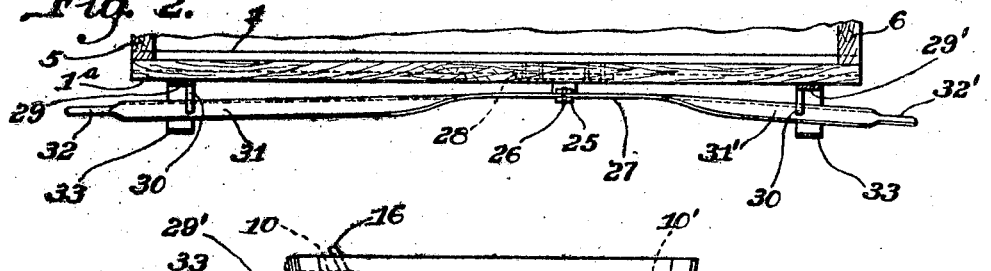
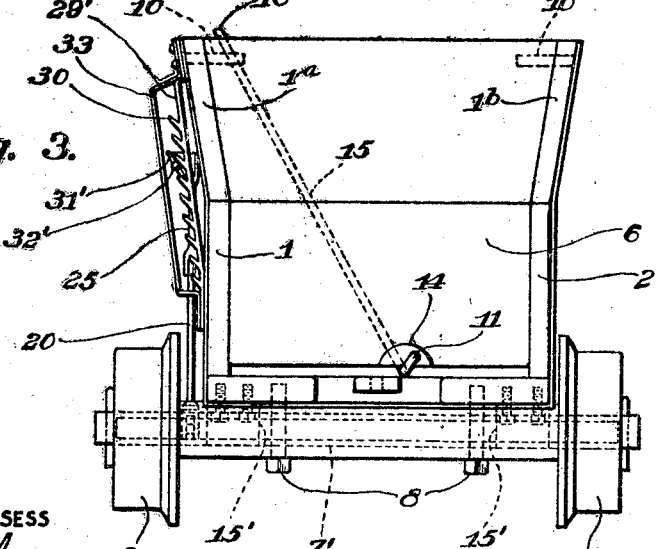

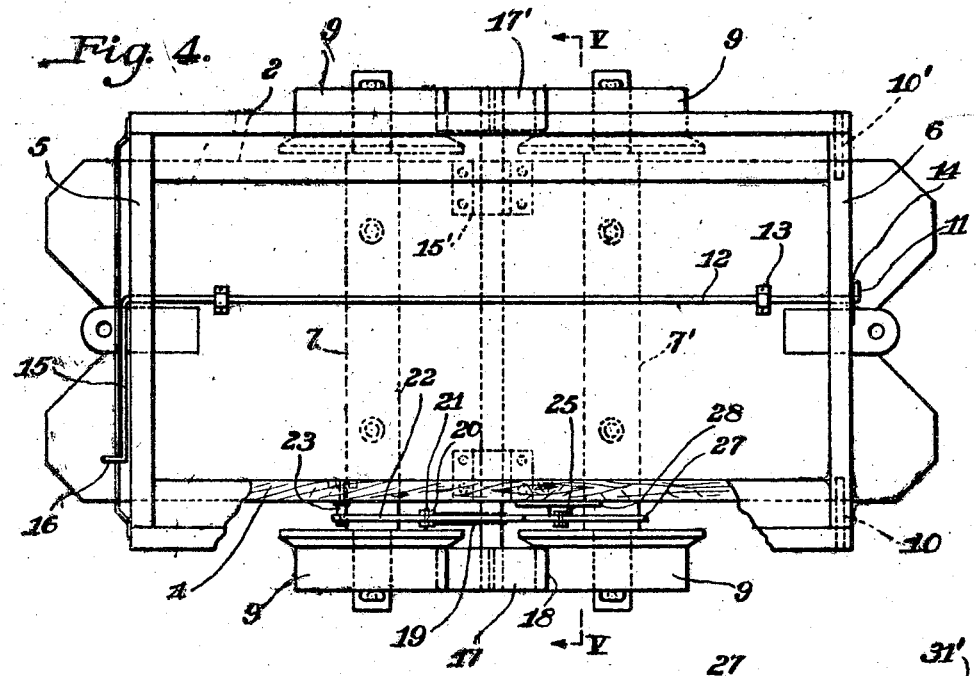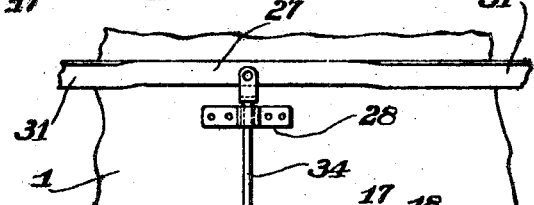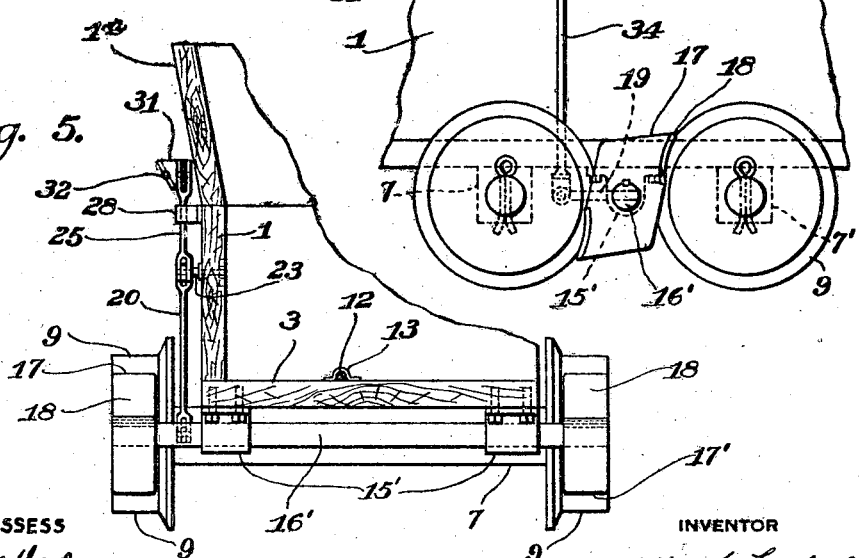

Patented May 20, 1924.

1,494,363

UNITED STATES PATENT OFFICE.

ALBERT W. LUSEBRINK, OF IRWIN, PENNSYLVANIA.

CAR BRAKE.

Application filed January 30, 1924. Serial No. 689,433.

*To all whom it may concern:*

Be it known that I, ALBERT W. LUSEBRINK, a citizen of the United States, and a resident of Irwin, in the county of Westmoreland and State of Pennsylvania, have invented a new and useful Improvement in Car Brakes, of which the following is a specification.

This invention relates to certain new and useful improvements in mining-cars, and particularly to a novel form of brake mechanism therefor.

It is an object of the invention to provide a simple, compact, sturdy and efficient brake mechanism which will withstand the rough usage to which mine-cars are generally subjected, which is economical to manufacture, and which can be readily installed upon cars already in use or furnished as a part of their initial equipment.

It is a special object to provide a brake mechanism which is adapted to be operated from either end of the car by the same actuating element for the purpose of either applying or releasing the brakes, that is, one by which the brakes may be either applied or released from either end regardless of the then condition of the brakes due to previous actuation thereof from the opposite end of the car.

It is also a special object to provide a brake mechanism in which the actuating element thereof, for applying or releasing the brakes, does not extend beyond the laterally projecting portions of the hopper or car body so as to reduce to a minimum the dangers to the operator during manipulation of the brakes.

It is another special object to provide the actuating bar forming the initial element of the connecting parts for moving the brake blocks in the form of a flexible bar having its terminal portions so shaped as to serve, in conjunction with suitable toothed racks, directly as the locks thereof thereby simplifying the construction.

Further special objects are to provide a brake mechanism of the character referred to in which the retaining means at the opposite terminal portions of the actuating bar serve as fulcrums during movement of either terminal portion of the said bar during application and release of the brakes, in which the guide lug for some of the parts forming the connection between the actuating bar and rock shaft on which the brake blocks are mounted serves not only as a guide but is so disposed horizontally relatively to the remaining parts as to utilize the flexibility of the actuating bar to normally urge the terminal portions thereof into engagement with the tooth racks, and vertically positioned to serve as a limiting stop preventing excessive movement of the brake blocks during the actuation thereof to release the brakes.

These and other objects of the invention will more fully appear when taken in conjunction with the following description and the appended claims.

In the accompanying drawings Fig. 1 is a side elevation of a mining-car equipped with the preferred form of the invention; Fig. 2 a fragmentary sectional view, taken on the line II—II of Fig. 1, showing the flexing of the actuating bar for maintaining the terminal portions thereof in engagement with the toothed racks; Fig. 3 an end elevation looking in the direction of the arrows III—III of Fig. 1; Fig. 4 a plan view of the parts illustrated in Fig. 1; Fig. 5 a fragmentary vertical section taken substantially on the line V—V of Fig. 4; and Fig. 6 a fragmentary elevational view showing a modified form of connection between the actuating bar and the brake blocks.

The mining-car illustrated in the drawings is of a well known type, being equipped with the usual body and running gear having supporting wheels. The body or hopper comprises the side walls 1, 2, the bottom or floor 3, the end wall 5, and the pivoted end gate 6.

As shown, the body or hopper is equipped with a well known type of running gear consisting of a pair of spaced axles 7, 7' which may be attached to the bottom of the car in any suitable manner, as by bolts such as indicated at 8. Mounted on the ends of these axles are supporting wheels 9.

The tail gate 6 conforms in shape to the space between the bottom and side walls of the body, and is pivoted to the side walls at the points 10, 10'. In order to lock the tail gate in closed position as illustrated in the drawings, the bent terminal 11 of an oscillating bar 12 suitably mounted upon the floor 3 by means of straps 13 projects beyond the tail gate when in closed position, as clearly indicated in Fig. 4, a wear plate 14 being attached to the tail gate and underlying the extremity 11. The opposite end of the oscillating rod 12 is bent angularly so as to form a handle 15 which projects upwardly to the top of the body and is equipped at its extremity with a hand grip 16. By moving the handle 15 to oscillate the rod 12, the terminal 11 may be moved so as to lie in a horizontal position immediately below the lower edge of the gate, at which time the gate may be opened due to swinging movement about its pivotal supports 10, 10', in an obvious manner.

The lower portions of the side walls 1 and 2 extend substantially vertically, while their upper portions flare outwardly as indicated at 1ª and 1ᵇ, and the actuating mechanism for the brakes is mounted so as to utilize the outward flare of the sides to lessen the danger to the operator during manipulation of the brakes, as will be presently pointed out more in detail.

Extending the full length of the car body or hopper, and suitably journaled in a pair of spaced supporting straps 15', 15' is a rock shaft 16', carrying at its opposite ends the brake blocks 17, 17'. Each of these brake blocks is equipped with suitable brake shoes indicated at 18, the brake blocks cooperating with the peripheries or faces of the supporting wheels in a well known manner. The rock shaft 16, adjacent one end thereof, is equipped with a rod 19 which is rigidly attached to the shaft and projects laterally therefrom, as indicated in Fig. 1 of the drawings.

It is obvious that rocking movement of the shaft 16 in one direction will bring the brake shoes into frictional contact with the peripheries of the supporting wheels, while rocking movement in the opposite direction will release the brakes by moving the shoes away from the wheels.

In order to enable the operator to rock the shaft 16 in either direction, at will, and from the opposite ends of the car or hopper, the following mechanism is preferably employed: A link 20 has its lower extremity pivotally connected to the end of the rod 19 while its upper end is pivotally connected as at 21 to the lever 22 fulcrumed to the side wall 1 at the point 23. The opposite end of the lever 22 has pivotally attached thereto at 24 the lower end of a link 25 the upper end of which is pivoted at 26 to a flexible actuating bar 27 of a special construction extending the full length of the car body. The central portion of the actuating bar is maintained in a predetermined vertical position relative to the side wall 1 by means of the apertured guiding lug or strap 28 attached to the side walls of the hopper, the body of the link 25 being threaded through the aperture of the lug.

Attached to the side wall 1, adjacent the opposite ends thereof, are a pair of locking or retaining devices in the nature of toothed racks, these racks as a whole being designated by the reference numerals 29, 29'. Each of the racks is provided with a series of spaced upwardly inclined projections or teeth 30, the spaces or interstices between teeth being adapted to receive and retain the terminal portions 31 and 31' of the flexible bar 27, the body of the bar being so bent throughout the terminal portions as to cause the same to be inclined to the vertical to enable the same to readily enter the space between the teeth 30, all as clearly shown in Figs. 2 and 3. The extremities of the bar 27 extend slightly beyond the ends of the car body and are equipped with the hand grips 32 and 32'.

Each of the toothed racks 29, 29' are attached to the side walls of the car so as to bridge the vertex of the angle formed by the lower and upper portions 1 and 1ª, so that the grips 32, 32' will normally lie within the limits bounded by the uppermost edges of the flared portions of the side walls of the body. The racks, however, are disposed horizontally relatively to the guiding lug 28 so that the bar 27 will be flexed sufficiently to normally urge the terminal portions 31, 31' into contact with the toothed racks. This feature is clearly illustrated in Fig. 2 of the drawings. In order to serve as an additional protection to the operator while manipulating the bar 27, as well as for the purpose of protecting the racks, each of the racks is equipped with a guard 33 of well known construction.

The guiding lug 28, as previously explained, is disposed horizontally with reference to the retaining racks 29, 29', to cause the bar 27 to be flexed intermediate its ends. This guiding lug is also positioned vertically to serve as a limiting stop upon release of the brakes, it being placed so as to prevent undue lowering of the pivotal point 26 whereby to arrest the rocking movement of the rock shaft 16 after the brakes have been fully released.

The operation of the device is as follows:—By gripping either extremity of the flexible bar 27, it is obvious that the adjacent terminal portion may be released from its toothed retaining rack, after which the bar may be bodily moved in the nature of a lever about the pivotal support afforded by the terminal portion at the opposite end of the bar which is still engaged with its retaining rack.

Upward movement of the bar will exert a pull through the link 25, lever 22, link 20, and rod 19 to rock the shaft 16 and apply the brakes in an obvious fashion, while lowering of the bar will in like manner rock the shaft 16 in a direction to release the brakes. After the brakes have been moved to the desired position, release of the bar will permit the tension thereof to force it in its adjusted position into engagement with the retaining rack. During the movement of the bar 27, the link 25 slides vertically through the guiding lug 28, always maintaining the pivotal point 26 and the intermediate portion of the bar 27 sufficiently close to the side wall 1 to maintain the actuating bar in its flexed condition so as to urge the terminal portions thereof into contact with the retaining racks.

The desired braking effect may be regulated by placing the terminal portion of the bar 27 into engagement with the appropriate space between the teeth 30 and in the event that the brakes are fully released, the guiding lug 28 prevents excessive movement of the operative connections between the bar 27 and the rock shaft 16 carrying the brake blocks.

It is apparent, that the brakes may be operated by the bar 27 regardless of which end is gripped by the operator. When the bar is gripped at 32, the rack 29 serves as a pivotal support for the terminal portion 31', while the rack 29 serves as a pivotal support for the terminal portion 31 in the event that the bar is actuated from the end 32'. In either case, upward movement of the bar acts through the operative connections previously described to apply the brakes and lowering of the bar serves to release the same.

In the preferred form, illustrated in Figs. 1 to 5, a special lever 22 is included in the operative connections between the actuating bar and the rod 19 whereby to secure additional leverage. This proves extremely satisfactory upon cars of larger size. In some instances, however, the additional leverage thus afforded is not necessary particularly upon cars of light weight, and under these circumstances an operative connection by means of a single link may be used, as illustrated in the modified embodiment of the invention, as shown in Fig. 6. In this embodiment, flexible bar 27 has pivotally attached thereto a link 34, the lower extremity of which is pivotally attached directly to the rod 19. The link 34 passes through the apertured guiding lug 28, similarly to the passage of the link 25 in the preferred construction.

The operation of this modified form is obvious from the above description, and need not be repeated.

Although the invention has been described and illustrated in connection with brake blocks mounted upon the opposite ends of an oscillating rock shaft, and the pull of the actuating bar described as being in an upward direction for the purpose of applying the brakes, it is obvious that many features of the invention may be employed in conjunction with other types of brakes, and that it is immaterial whether the brakes are released or applied by the upward movement of the actuating bar. In other words, instead of arranging the parts to form a so-called "pull-brake," as illustrated, the arrangement can be changed in an obvious fashion to form a "push-brake," in which event the inclination of the teeth on the retaining racks will be reversed. It is therefore not intended to limit the invention beyond that particularly pointed out and defined by the appended claims.

It is thus seen that the invention provides a simple, compact, sturdy and efficient brake mechanism for use on mining-cars, or similar vehicles, one which enables the brakes to be operated by actuation of a single actuating element from either end of the car for the purpose of either applying or releasing the brakes, one in which the actuating element gripped by the operator does not extend laterally beyond the limits defined by the car body, one in which the actuating element is normally maintained in its adjusted position due to flexibility thereof obtained by a novel relative positioning of the several parts of the mechanism, and one in which a single guiding lug not only serves as a guide but as a stop preventing undue movement of the brake blocks when the brakes are fully released.

I claim:

1. In combination in a mine-car comprising a hopper mounted upon a suitable running gear having supporting wheels, brake blocks cooperating with said wheels, an actuating bar extending the full length of the hopper, pivotal supports for the opposite ends of said bar, and operative connections between the actuating bar and the brake blocks.

2. In combination in a mine-car comprising a hopper mounted upon a suitable running gear having supporting wheels, brake blocks cooperating with said wheels, an actuating bar extending the full length of the hopper, a series of projections adjacent the opposite ends of the hopper adapted to serve as pivotal supports for the bar, the terminal portions of the bar being freely engageable with and removable from the said projections, and operative connections between the bar and the brake blocks.

3. In combination in a mine-car comprising a hopper mounted upon a suitable running gear having supporting wheels, brake blocks cooperating with said wheels, an actuating bar extending the full length of the hopper, toothed retaining racks fixed to the hopper and underlying the terminal portions of the bar, said terminal portions being adapted to loosely engage its respective rack whereby to be pivotally supported, and operative connections between the bar and brake blocks.

4. In combination in a mine-car comprising a hopper mounted upon a suitable running gear having supporting wheels, brake blocks cooperating with said wheels, an actuating bar extending the full length of the hopper, retaining racks fixed to the hopper and underlying the terminal portions of the bar, said racks being provided with upwardly inclined teeth adapted to removably engage the terminal portion cooperating therewith whereby to pivotally support the same, the portions of the body of the bar contacting the said racks being inclined to the vertical whereby to readily enter the interstices between adjacent teeth of the racks, and operative connections between the actuating bar and the brake blocks.

5. In combination in a mine-car comprising a hopper mounted upon a suitable running gear having supporting wheels, brake blocks cooperating with said wheels, a flexible actuating bar extending the full length of the hopper, toothed-retaining racks fixed to the hopper and underlying the opposite terminal portions of the bar, said terminal portions being adapted to removably engage its respective rack whereby to be pivotally supported, operative connections between the bar and brake blocks, said connections including a downwardly depending rod, and an apertured guiding lug through which the said rod is threaded, the guiding lug being so disposed as to urge the terminal portions of the actuating bar towards the said racks.

6. In combination in a mine-car comprising a hopper mounted upon a suitable running gear having supporting wheels, brake blocks cooperating with said wheels, a flexible actuating bar extending the full length of the hopper, toothed-retaining racks fixed to the hopper and underlying the opposite terminal portions of the bar, said terminal portions being adapted to removably engage its respective rack whereby to be pivotally supported, operative connections between the bar and brake blocks, said connections including a downwardly depending rod, and an apertured guiding lug through which the said rod is threaded, the guiding lug being so disposed horizontally as to constantly flex the bar to urge the terminal portions thereof towards the racks and positioned vertically so as to serve as a limiting stop preventing excessive movement upon release of the brakes.

In testimony whereof, I sign my name.

ALBERT W. LUSEBRINK.

Witness:
EDWIN O. JOHNS.